United States Patent
Hill et al.

(10) Patent No.: US 11,212,265 B2
(45) Date of Patent: Dec. 28, 2021

(54) PERFECT FORWARD SECRECY (PFS) PROTECTED MEDIA ACCESS CONTROL SECURITY (MACSEC) KEY DISTRIBUTION

(71) Applicant: Cisco Technology, Inc., San Jose, CA (US)

(72) Inventors: Craig Thomas Hill, Sterling, VA (US); Chennakesava Reddy Gaddam, Karnataka (IN); Annu Singh, Karnataka (IN); Gaurav Kumar, Punjab (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

(21) Appl. No.: 16/738,722

(22) Filed: Jan. 9, 2020

(65) Prior Publication Data

US 2021/0218717 A1 Jul. 15, 2021

(51) Int. Cl.
*H04L 29/06* (2006.01)
*H04L 9/30* (2006.01)
*H04L 9/08* (2006.01)

(52) U.S. Cl.
CPC ........ *H04L 63/0442* (2013.01); *H04L 9/0825* (2013.01); *H04L 9/085* (2013.01); *H04L 9/0841* (2013.01); *H04L 9/30* (2013.01); *H04L 63/061* (2013.01)

(58) Field of Classification Search
CPC . H04L 63/0442; H04L 9/0825; H04L 9/0841; H04L 9/085; H04L 9/30; H04L 63/061
See application file for complete search history.

(56) References Cited

U.S. PATENT DOCUMENTS

| | | | | |
|---|---|---|---|---|
| 9,838,363 B2* | 12/2017 | Sun | ................. | H04L 63/061 |
| 2009/0217032 A1* | 8/2009 | Guan | ................. | H04L 63/123 |
| | | | | 713/154 |
| 2013/0191631 A1* | 7/2013 | Ylonen | .............. | H04L 63/16 |
| | | | | 713/153 |
| 2013/0243194 A1* | 9/2013 | Hawkes | ............ | H04W 12/041 |
| | | | | 380/270 |
| 2014/0050320 A1* | 2/2014 | Choyi | .............. | H04W 12/06 |
| | | | | 380/270 |
| 2018/0302269 A1* | 10/2018 | Sankaran | ........... | H04L 63/061 |

OTHER PUBLICATIONS

Weis, Brian. "Security considerations and proposal for MACsec key establishment." May 15 (2006): 1-18. (Year: 2006).*
Hauser, Frederik, et al. "P4-MACsec: Dynamic topology monitoring and data layer protection with MACsec in P4-based SDN." IEEE Access 8 (2020): 58845-58858. (Year: 2020).*

* cited by examiner

*Primary Examiner* — Techane Gergiso
(74) *Attorney, Agent, or Firm* — Polsinelli PC

(57) ABSTRACT

A non-transitory computer readable medium including instructions stored thereon, when executed, the instructions being effective to cause at least one processor of a first network device to: derive a private key encryption key based on a public key, a first private key of the first network device, a second private key of a live peer device, and a Connectivity Association Key (CAK); transmit a secret key encrypted by the private key encryption key to the live peer device; and receive a communication from the live peer device, the communication being encrypted by the secret key.

15 Claims, 6 Drawing Sheets

PFS KEK generaion

KEK generation

PERFECT FORWARD SECRECY (PFS) PROTECTED MEDIA ACCESS CONTROL SECURITY (MACSEC) KEY DISTRIBUTION

TECHNICAL FIELD

The present technology pertains a method for secure key distribution, and more specifically, pertains to Perfect Forward Secrecy (PFS) protected Media Access Control Security (MACsec) key distribution.

BACKGROUND

Encrypted communications is an important layer of security for network communications. Typically, both a sender and receiver can exchange or otherwise learn of a key that can be used to encrypt and decrypt messages between the sender and receiver. However, such communications are only as secure as the key itself. Some technologies require a key to be shared via a network communication. Other technologies provide a methodology in which an encryption key can be derived based on some initial shared information. However, such technologies are all vulnerable because intercepting the key or deriving the key are possible.

Media Access Control Security (MACsec) is an 802.1AE IEEE industry-standard security technology that provides secure communication for all traffic on Ethernet links. Some example models of Media Access Control Security (MACsec) are vulnerable to hacks due to their key distribution scheme. One of the main reasons for this is that the key hierarchy starts from a single Connectivity Association Key (CAK). The single Connectivity Association Key (CAK) is used to derive the Key Encrypting Key (KEK), which is used to encrypt the distribution of Media Access Control Security (MACsec) Secret Key (SAK). The Key Encrypting Key (KEK) is always static, because it is partially derived from a static Connectivity Association Key Name (CKN). Thus, once the single root key Connectivity Association Key (CAK) is compromised, the whole key hierarchy including the Key Encrypting Key (KEK) and the Media Access Control Security (MACsec) Secret Key (SAK) would also be compromised.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A and FIG. 4B are example detailed diagrams illustrating a Media Access Control Security (MACsec) Key Agreement Protocol Data Unit (MKPDU) parameter sets composition for the Perfect Forward Secrecy (PFS) protected Media Access Control Security (MACsec) key distribution utilizing the Diffie-Hellman (DH) key exchange principle in accordance with some aspects of the present technology.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The disclosed technology addresses the need in the art for a more secured private encryption key. Some example models of Media Access Control Security (MACsec) are vulnerable to hacks. One of the main issues is rooted in the nature of the key hierarchy. An example key hierarchy starts from a single root key (CAK) being used to derive the private key encryption key (KEK). The private key encryption key (KEK) is always static in these examples, because it is partially derived from a static Key Name (CKN). Thus, once the single root key is compromised, the whole key hierarchy including the private key encryption key (KEK) and the secret key (SAK) would also be compromised.

The present technology aims to solve at least such a static private key encryption key (KEK) issue. For example, this is accomplished in at least two aspects. First, the private key encryption key (KEK) would change at least for each session within a communication, making it more difficult to hack the whole communication. Second, introduce another dynamic source in addition to the root key to derive the private key encryption key (KEK). With the new dynamic source, even if the root key is compromised, the private key encryption key and the secret key (SAK) would still be secure.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
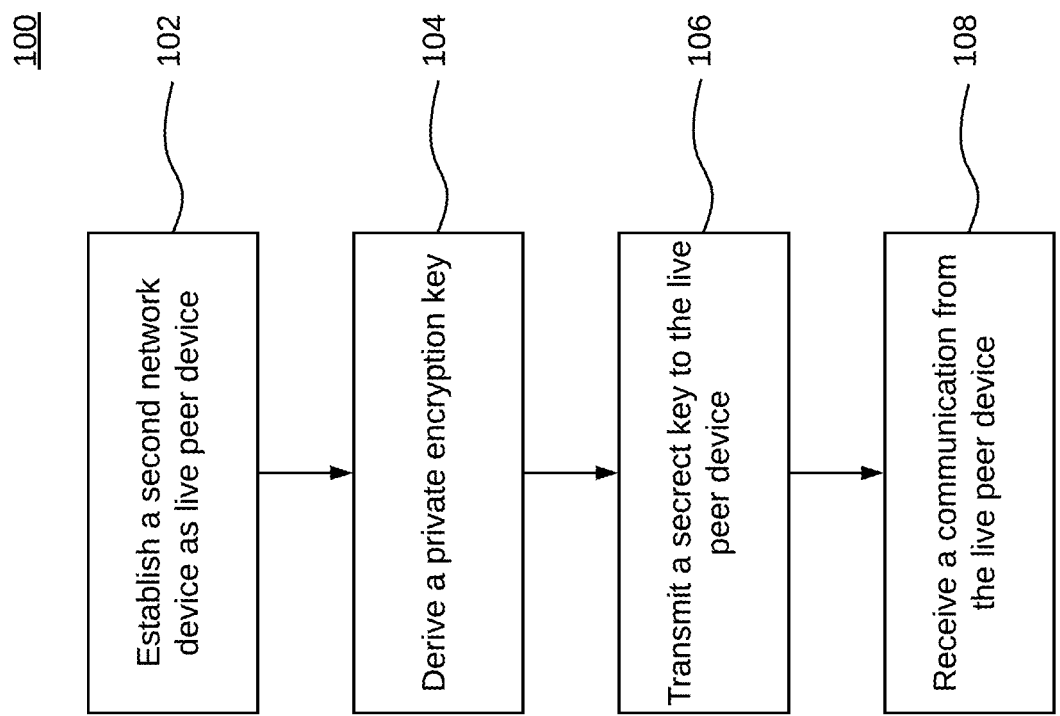
FIG. 1 illustrates an example method for transmitting an encrypted secret key, which is being used to encrypt communications between two live peer devices in accordance with some aspects of the present technology.

FIG. 1 illustrates an example method (100) of transmitting an encrypted communications encrypted by a secret key (SAK) between two live peer devices. A live peer device is another device that has successfully identified itself with the proper identification to have secure connections and communications with the current device.

When devices establish each other as live peer devices (102), they need to agree on a secret key (SAK) to encrypt communications, but the secret key must be securely shared. In order to securely share the secret key, both network devices can derive a private key encryption key (104). The private key encryption key (KEK) is considered private because it is never shared over the network.

The live peer devices can derive a dynamic private encryption key (104) by sharing partial information to derive the final private encryption key with each other, while keeping some other information to derive the final private encryption key to themselves. By the shared partial information and the other information of their own, the devices would be able to derive the final private key encryption key (KEK) by themselves, without ever exposing it over public channel.

The secret key can be encrypted by various different encryption methods for secure transmission of the secret key to the live peer device (106). For example, the private key encryption key (KEK) can be used to further encrypt the secret key during transmission between live peers. The secret key could be various different encryption keys, for example, a Media Access Control Security (MACsec) Secret Key (SAK). For example, the secret key could be encrypted by a peer specific Key Encrypting Key (KEK) addressed below with regard to FIG. 2.

Once the secret key has been shared between the live peers, communications between the live peers can be encrypted using the secret key such that one of the live peers can receive a communication (108) from the live peer encrypted using the secret key. The communications between the live peer devices can take place as a series of secure sessions encrypted with the secret key. Since the secret key was shared over the network using a dynamic key encryption key (KEK) that has never been transmitted over the network, it is much more likely that the secret key can not be learned, intercepted, and thus can not be decrypted, or compromised.

Figure 2:
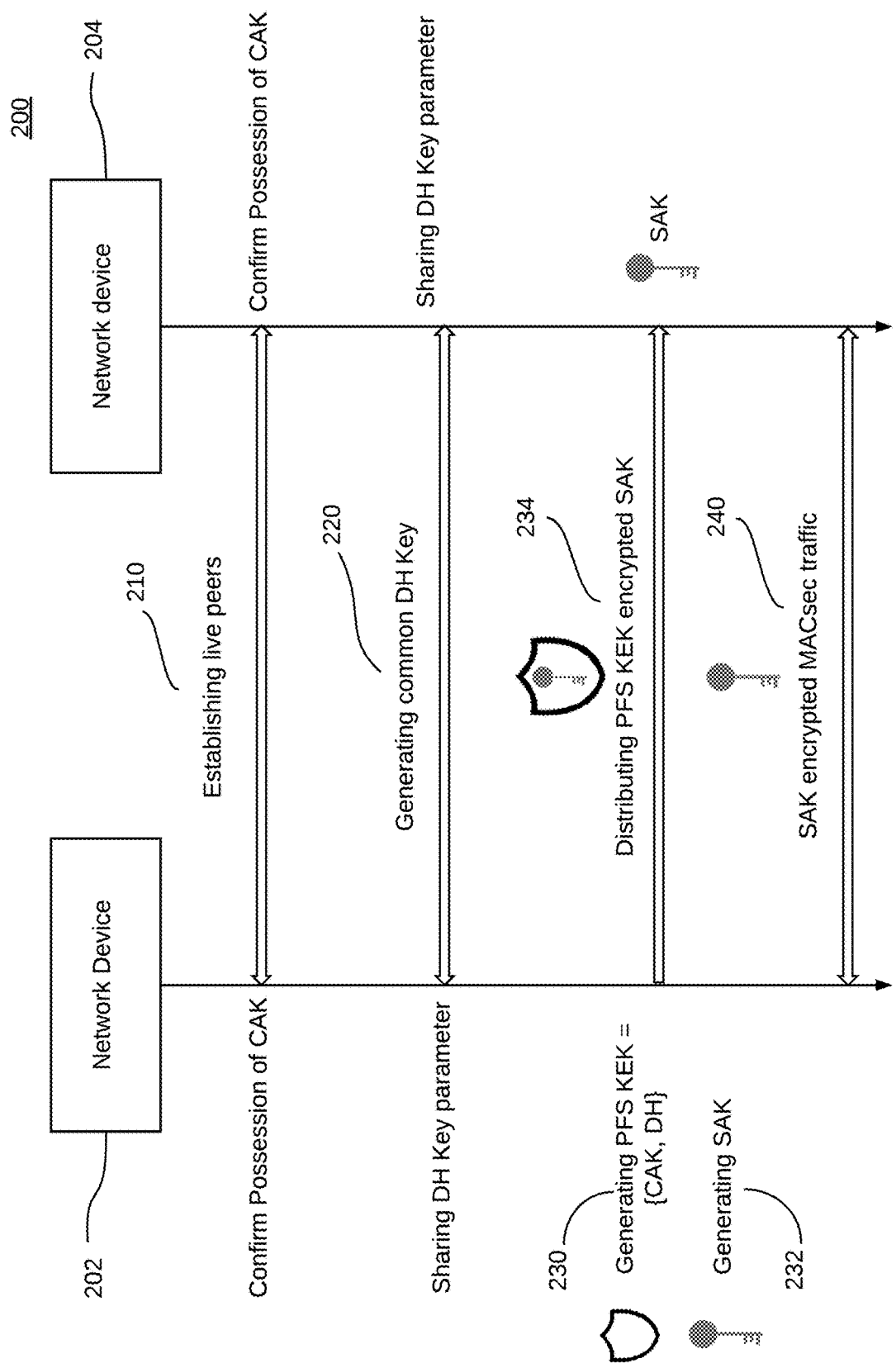
FIG. 2 is an example schematic system diagram illustrating a Perfect Forward Secrecy (PFS) protected Media Access Control Security (MACsec) key distribution in accordance with some aspects of the present technology.

FIG. 2 is a schematic system diagram illustrating an example Perfect Forward Secrecy (PFS) protected Media Access Control Security (MACsec) key distribution (200).

In general, Media Access Control Security (MACsec) peers on the same Local Area Network (LAN) belong to a unique connectivity association. Members of the same connectivity association identify themselves with the shared Connectivity Association Key (CAK) and Connectivity Association Key Name (CKN). The Connectivity Association Key (CAK) is a static key that is preconfigured on each Media Access Control Security (MACsec) enabled interface. Some example of the Media Access Control Security (MACsec) authentication are based on mutual possession and acknowledgment of the preconfigured Connectivity Association Key (CAK) and Connectivity Association Key Name (CKN). Specifically, an example Key Encrypting Key (KEK) is composed of a Key portion, a Label portion, a Key ID portion, and a Key Encrypting Key (KEK) length portion. The Key portion is usually derived from the Connectivity Association Key (CAK). The Key ID portion is usually the first 16 octets of the Connectivity Association Key Name (CKN), which is static. The Label portion and the Key Encrypting Key (KEK) length portion are preset static parameters. Thus, such an example Key Encrypting Key (KEK) is always static.

To secure the whole key hierarchy of the Media Access Control Security (MACsec), a more dynamic Key Encrypting Key (KEK) is required. One specific example method for deriving such a dynamic private key encryption key is through a Perfect Forward Secrecy (PFS) protected Media Access Control Security (MACsec) key distribution (200) utilizing the Diffie-Hellman (DH) key exchange. Diffie-Hellman (DH) key exchange is a method of securely exchanging cryptographic keys over a public channel to achieve Perfect Forward Secrecy (PFS), which is a feature of specific key agreement protocols that gives assurances that session keys will not be compromised even if the private key of the server is compromised. A Diffie-Hellman (DH) key is composed of a public key (an arbitrary public component of the Diffie-Hellman (DH) key), a first private key of the first network device, and a second private key of a live peer device (two private components of the Diffie-Hellman (DH) key from each network device engaging in a Diffie-Hellman (DH) key exchange). Two network devices first agree on the arbitrary public component of the final Diffie-Hellman (DH) key. Each network device also select their own private component of the final Diffie-Hellman (DH) key. Both network devices only transmit the combination of their own private component and the public component of the final Diffie-Hellman (DH) key. Then, both network devices derive the shared final Diffie-Hellman (DH) key by combining their own private component with the combination of the other private component (which they can derive from the communication that is a combination of the other devices' private component and the public component) and the public component. One of the main advantages of the Diffie-Hellman (DH) key exchange is that Diffie-Hellman (DH) key could be generated without ever exposing the final Diffie-Hellman (DH) key on a public channel, and it would be computationally difficult to derive the final Diffie-Hellman (DH) key with what is available over the public channel.

The system shown in FIG. 2 includes a network device 202, and another network device 204. In this example system, network device 202 is acting as the key server and the network device 204 is acting as the non-key server. However, this system is not limited to two network devices, for example, this diagram could illustrate the connection between the key server network device 202 and any number of other network devices 204.

For key server network device 202 to establish network device 204 as its live peer (210), both devices need to conduct peer discovery. Specially, in a Media Access Control Security (MACSec) standard, a live peer is another device that belongs to the same unique connectivity association, and can periodically exchanging Media Access Control Security (MACsec) Key Agreement Protocol Data Unit (MKPDU) to confirm common possession of identical Connectivity Association Key (CAK) and a Connectivity Association Key Name (CKN). For example, in the Media Access Control Security (MACsec) protocol, the process of peer discovery includes, confirming common possession of a Connectivity Association Key (CAK) and a Connectivity Association Key Name (CKN) on both network devices 202 and 204. To confirm common possession of the Connectivity Association Key (CAK) and the Connectivity Association Key Name (CKN), network device 202 sends the basic parameter set, and Integrity Check Value (ICV) which is required to establish live peer devices, in a Media Access Control Security (MACsec) Key Agreement Protocol Data Unit (MKPDU). After receiving the basic parameter set and Integrity Check Value (ICV), network device 204 computes the Integrity Check Value (ICV) of the received packet using it's ICK (Integrity Check Key) which is derived from it's secret key (CAK) and if ICV validation is success, then it sends its basic parameter set and Integrity check value (ICV) in the next Media Access Control Security (MACsec) Key Agreement Protocol Data Unit (MKPDU) to key server network device 202. This Media Access Control Security (MACsec) Key Agreement Protocol Data Unit (MKPDU) also carries network device 204's Message Indicator (MI) and Message Number (MN). In an example system utilizing the Diffie-Hellman (DH) key exchange, both the key server network device 202 and the network device 204 also advertise support for a Diffie-Hellman (DH) key group using announcement parameter set along with basic parameter sets and Integrity check value (ICV) in every Media Access Control Security Key Agreement Protocol Data Unit (MKPDU). This advertisement of the Diffie-Hellman (DH) parameter set is to generate a Diffie-Hellman (DH) key for later use in the example Perfect Forward Secrecy (PFS) protected Media Access Control Security (MACsec) key distribution utilizing the Diffie-Hellman (DH) key exchange principle. This Diffie-Hellman (DH) key will replace the static Connectivity Association Key Name (CKN) in deriving the dynamic Key Encrypting Key (KEK) from Connectivity Association Key (CAK).

In some embodiments, after network devices 202 and 204 establish each other as live peers (210), both network devices 202 and 204 generate a common Diffie-Hellman (DH) key (220) as addressed above. The key server network device 202 can send the Diffie-Hellman (DH) key parameter set. An example of Diffie-Hellman (DH) key parameter set contains the combination of the public component of the Diffie-Hellman (DH) key and key server network device 202's private component of the Diffie-Hellman (DH) key. After receiving the Diffie-Hellman (DH) key parameter set, network device 204 can derive the Diffie-Hellman (DH) key utilizing the above combination of the public component and key server network device 202's private component of the Diffie-Hellman (DH) key. Network device 204 would also transmit a combination of public component of the Diffie-Hellman (DH) key and its own private component of the Diffie-Hellman (DH) key in the Diffie-Hellman (DH) parameter set to network device 202. Then, key server network device 202 can also derive the Diffie-Hellman (DH) key utilizing the above combination of the public component and network device 204's private component of the Diffie-Hellman (DH) key. The Diffie-Hellman (DH) key is peer specific, for example, such a key is unique for the communication between key server network device 202 and a specific network device 204. In some embodiments, after the Live peer convergence, the key server network device 202 would select the mutually common highest priority DH and sends the basic parameter set containing the selected DH group and key server network device 202's DH public key along with the announcement parameter set, basic parameter set, live peer list parameter set and Integrity check value (ICV) in the MKPDU frame to the non key server device 204. On receiving the DH parameter set, non key server network device 204 sends the DH parameter set containing its DH public key along with other parameter sets stated as above to the key-server device 202.

After generating the Diffie-Hellman (DH) key (220), the network device 202 begins to generate the Perfect Forward Secrecy Key Encrypting Key (PFS KEK) (230), and the Media Access Control Security (MACsec) Secret Key (SAK) (232). The Diffie-Hellman (DH) key is used to generate the Perfect Forward Secrecy Key Encrypting Key (PFS KEK). Specifically, an example of the Perfect Forward Secrecy Key Encrypting Key (PFS KEK) is composed of a Key portion, a Label portion, a Key ID portion, and a Key Encrypting Key (KEK) length portion. In this example, the Key portion is derived from the Connectivity Association Key (CAK), and the common Diffie-Hellman (DH) key is being used as the Key ID portion, instead of the first 16 octets of the Connectivity Association Key Name (CKN) as used in the traditional Key Encrypting Key (KEK). Such a Perfect Forward Secrecy Key Encrypting Key (PFS KEK) is used to encrypt the distribution of the Media Access Control Security (MACsec) Secret Key (SAK).

Key server network device 202 can then distribute Media Access Control Security (MACsec) Secret Key (SAK) to network device 204 (234) by using the Perfect Forward Secrecy Key Encrypting Key (PFS KEK) encrypted Media Access Control Security (MACsec) Secret Key (SAK) to network device 204 (234). Such distribution of the Media Access Control Security (MACsec) Secret Key (SAK) could also be distributed with an Advanced Encryption Standard (AES) wrap.

After completion of the above process, key server network device 202 and network device 204 can start communicating through a Media Access Control Security (MACsec) Secret Key (SAK) encrypted Media Access Control Security (MACsec) traffic (240). Such communication could take place as a series of secure sessions, and each of such secure sessions could only be established with a unique Media Access Control Security (MACsec) Secret Key (SAK) assigned to the secure session. These secure sessions expire and must be re-established after certain events, for example, a transmission of a certain number of frames, or after a peer device disconnects and reconnects. Thus, to establish or re-establish each of these secure sessions, a new Media Access Control Security (MACsec) Secret Key (SAK) would be generated to encrypt such secure session. Moreover, to encrypt the distribution of the new Media Access Control Security (MACsec) Secret Key (SAK), a new Perfect Forward Secrecy Key Encrypting Key (PFS KEK) would be generated for each new secure sessions.

With the implementation of a Diffie-Hellman (DH) key, the peer specific Key Encrypting Key (KEK) in this example method would be dynamic for at least two reasons. First, the dynamic Key Encrypting Key (KEK) would be different for each secure session of each communication conducted between the first network device and each of the other network devices. Second, even if the Connectivity Association Key (CAK) is compromised in the future, the Key Encrypting Key (KEK) would still be secure because the Diffie-Hellman (DH) key is not part of the root key of the key hierarchy of this example method, and it is dynamic for each secured session of each communication.

Figure 3B:
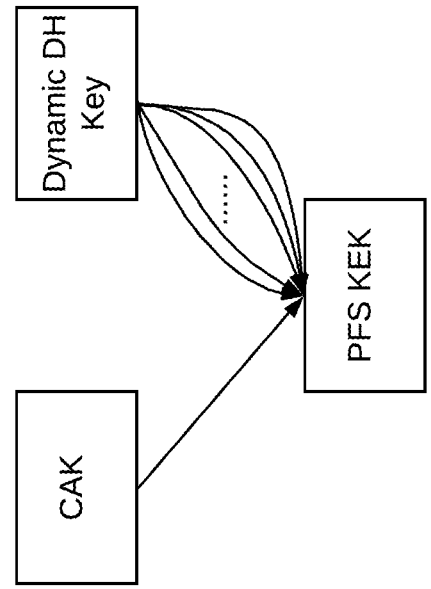
FIG. 3A and FIG. 3B are example schematic diagrams comparing Media Access Control Security (MACsec) Key Encrypting Key (KEK) generation utilizing a static Connectivity Association Key Name (CKN), and another Perfect Forward Secrecy (PFS) protected Media Access Control Security (MACsec) Key Encrypting Key (KEK) generation utilizing a Diffie-Hellman (DH) key in accordance with some aspects of the present technology.
Figure 3A:
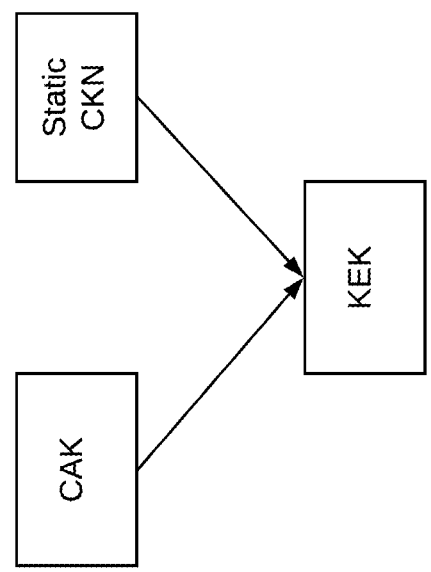

FIG. 3A is a schematic diagram illustrating a Media Access Control Security (MACsec) Key Encrypting Key (KEK) generation utilizing Connectivity Association Key (CAK) and a Connectivity Association Key Name (CKN) which are static for the session, and FIG. 3B is a schematic diagram illustrating an embodiment of Perfect Forward Secrecy (PFS) protected Media Access Control Security (MACsec) Key Encrypting Key (KEK) generation utilizing a Diffie-Hellman (DH) key. As shown in FIG. 3A, a Connectivity Association Key (CAK) and a Connectivity Association Key Name (CKN) are two major portions of the Media Access Control Security (MACsec) Key Encrypting Key (KEK) generation. In this example, the Key Encrypting Key (KEK) is always static, because it is derived from a static Connectivity Association Key (CAK) and a static Connectivity Association Key Name (CKN). Thus, once the single root key Connectivity Association Key (CAK) is compromised, the whole key hierarchy including the Key Encrypting Key (KEK) and the Media Access Control Security (MACsec) Secret Key (SAK) would also be compromised.

As shown in FIG. 3B, a Connectivity Association Key (CAK) and a dynamic Diffie-Hellman (DH) key are two major portions of such a Perfect Forward Secrecy Key Encrypting Key (PFS KEK) generation. In this example, the Perfect Forward Secrecy Key Encrypting Key (PFS KEK) is always dynamic, because it is partially derived from a dynamic Diffie-Hellman (DH) key. Such a dynamic nature of the Perfect Forward Secrecy Key Encrypting Key (PFS KEK) provides the following advantages:

The dynamic nature of the Perfect Forward Secrecy Key Encrypting Key (PFS KEK) provides the advantage of being more difficult to hack communications on the same network. Because the Diffie-Hellman (DH) key is peer specific, the Perfect Forward Secrecy (PFS) protected Media Access Control Security (MACsec) Key Encrypting Key (KEK) is also peer specific. For example, a network device would use a unique Perfect Forward Secrecy (PFS) protected Media Access Control Security (MACsec) Key Encrypting Key (KEK) with only one other network device. Thus, the peer specific Perfect Forward Secrecy Key Encrypting Key (PFS KEK) would make it even more computationally difficult to hack communications on the same network between different network devices.

The dynamic nature of the Perfect Forward Secrecy Key Encrypting Key (PFS KEK) also provides the advantage of being more difficult to hack a whole communication. Each time a secure session of a communication between two network devices expire and needs to be re-established after certain events, a new Media Access Control Security (MACsec) Secret Key (SAK) would be generated to encrypt such secure session, and so does a new Perfect Forward Secrecy Key Encrypting Key (PFS KEK). Thus, the secure session-specific Perfect Forward Secrecy Key Encrypting Key (PFS KEK) would make it even more computationally difficult to hack the whole communication between two network devices.

The dynamic nature of the Perfect Forward Secrecy Key Encrypting Key (PFS KEK) also provides the advantage of a more secure key hierarchy. With such a peer and secure session-specific Perfect Forward Secrecy Key Encrypting Key (PFS KEK), even if the root key Connectivity Association Key (CAK) is compromised, the Perfect Forward Secrecy Key Encrypting Key (PFS KEK) and the Media Access Control Security (MACsec) Secret Key (SAK) would still be secure.

Figures 4A, 4B:
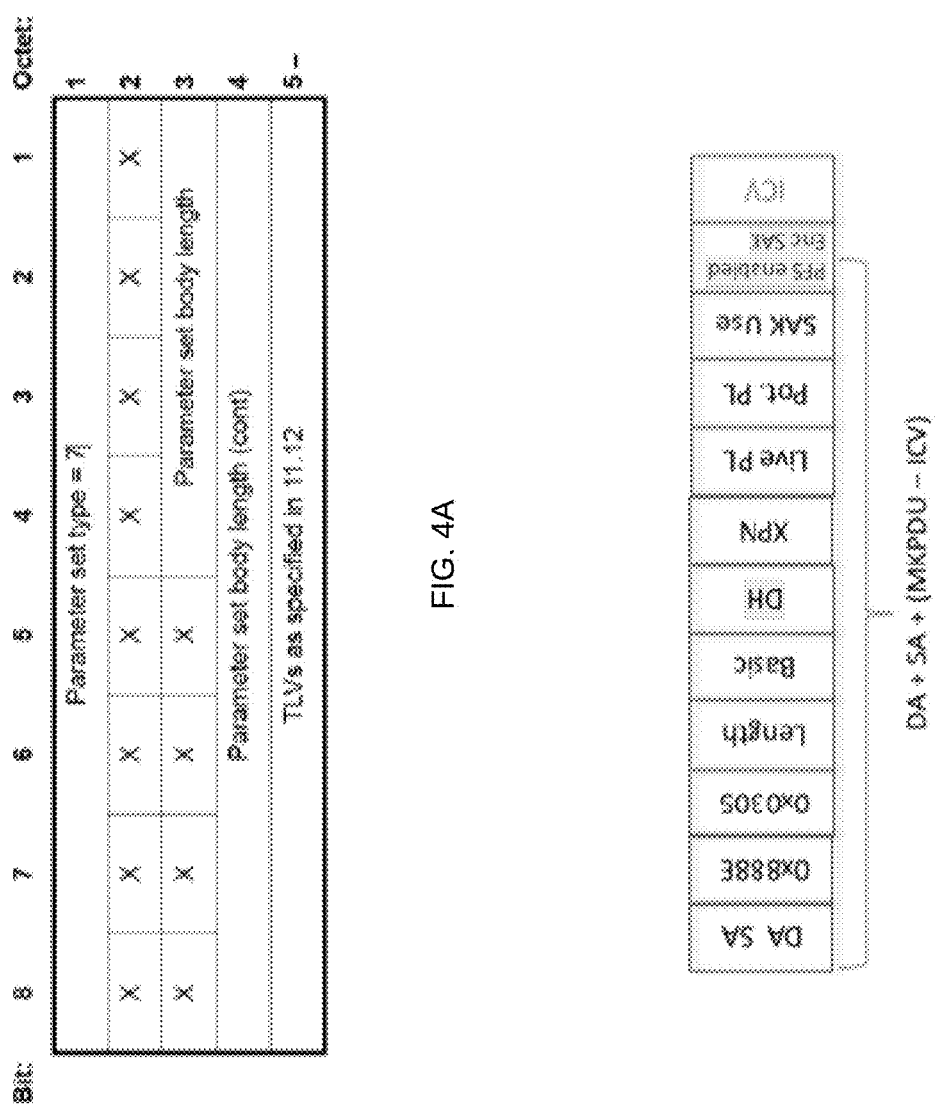

FIG. 4A illustrates an example of an announcement parameter set of a Media Access Control Security (MACsec) Key Agreement Protocol Data Unit (MKPDU) to support the Diffie-Hellman (DH) key group. Specifically, a Media Access Control Security (MACsec) Key Agreement Protocol Data Unit (MKPDU) is a series of variable length encoded parameter sets. The variable length depends on the number of live peers and the content of the parameter sets. In this example, an Announcement Type-Length-Value (TLV) has been modified for carrying a Diffie-Hellman (DH) key group as part of the new announcement parameter set.

FIG. 4B is an example detailed diagram illustrating a Media Access Control Security (MACsec) Key Agreement Protocol Data Unit (MKPDU) parameter sets composition for the Perfect Forward Secrecy (PFS) protected Media Access Control Security (MACsec) key distribution utilizing the Diffie-Hellman (DH) key exchange principle in accordance with some aspects of the present technology. In this example Media Access Control Security (MACsec) Key Agreement Protocol Data Unit (MKPDU) parameter sets composition, the Diffie-Hellman (DH) key group and the Perfect Forward Secrecy Key Encrypting Key (PFS KEK) and the Media Access Control Security (MACsec) Secret Key (SAK) (PFS enabled Enc SAK) have been included. This example Media Access Control Security (MACsec) Key Agreement Protocol Data Unit (MKPDU) parameter sets composition is not limited to only a single row, multiple rows could be included in an example Media Access Control Security (MACsec) Key Agreement Protocol Data Unit (MKPDU) parameter sets composition for multiple non-key servers.

Figure 5:
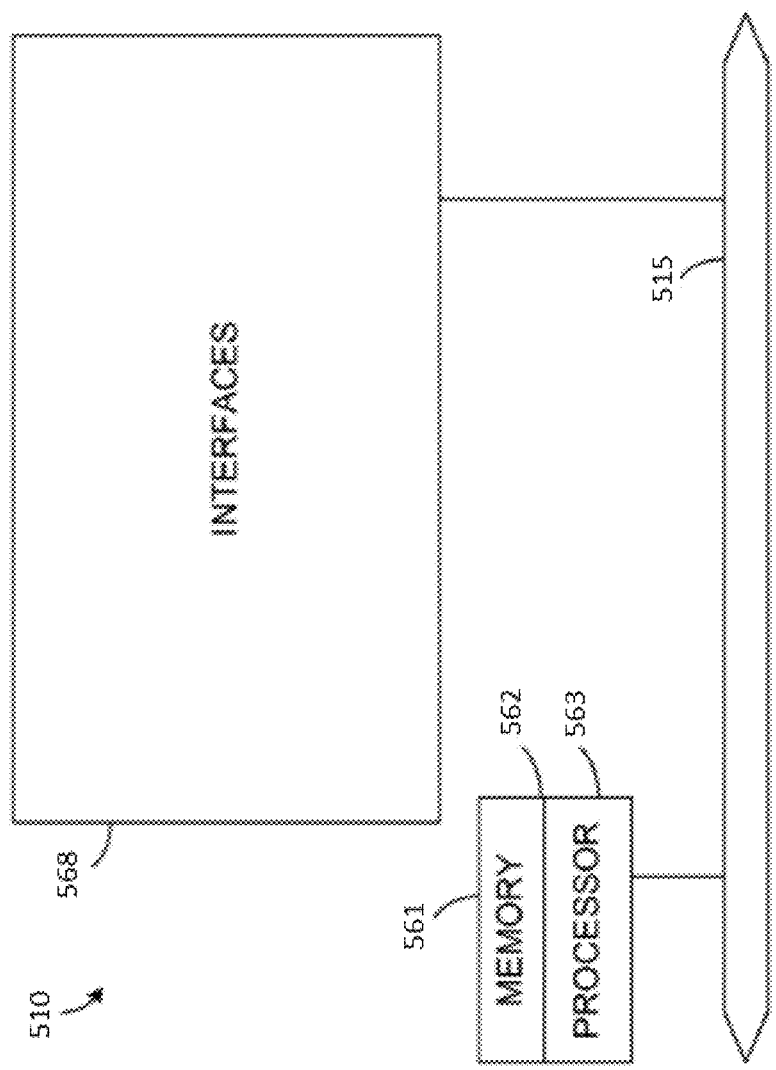
FIG. 5 illustrates an example configuration of devices and a network in accordance with some aspects of the present technology.

FIG. 5 illustrates an exemplary network device 510 suitable for implementing the present invention. Network device 510 includes a master central processing unit (CPU) 562, interfaces 568, and a bus 515 (e.g., a PCI bus). When acting under the control of appropriate software or firmware, the CPU 562 is responsible for processing information, such as establishing another live device as live peers, deriving a private encryption key, transmitting a secret key, and receiving a communication. It preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6:
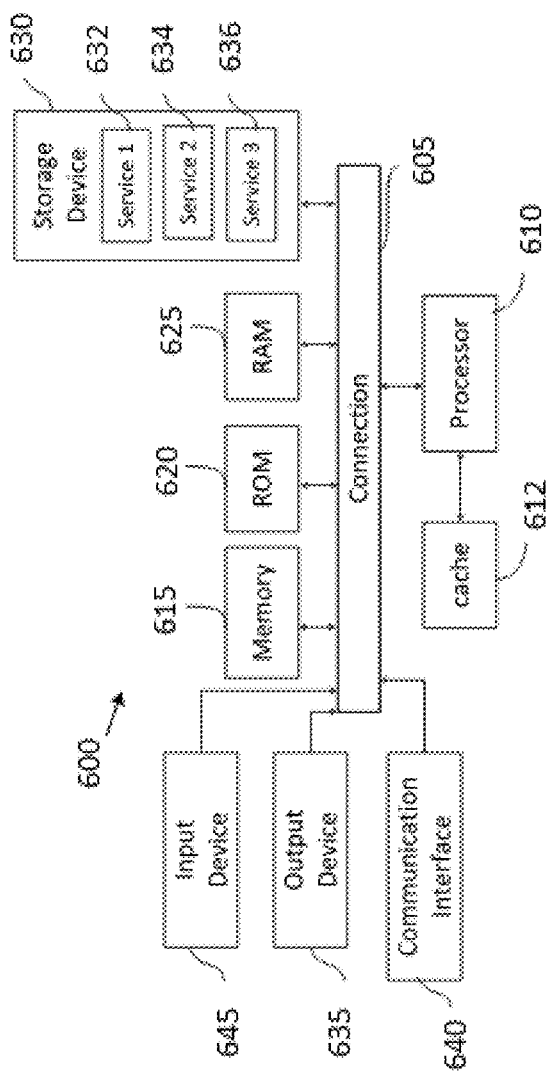
FIG. 6 shows an example computing system for network devices in accordance with some aspects of the present technology.

FIG. 6 shows an example of computing system 600, which can be for example any computing device making up network devices 202 and 204, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A non-transitory computer readable medium comprising instructions stored thereon, when executed, the instructions being effective to cause at least one processor of a first network device to:
    derive a private key encryption key based on a public key, a first private key of the first network device, a second private key of a live peer device, and a Connectivity Association Key (CAK);
    transmit a secret key encrypted by the private key encryption key to the live peer device; and
    receive a communication from the live peer device, the communication being encrypted by the secret key;
    wherein the private key encryption key is a Key Encrypting Key (KEK);
    wherein the private key encryption key is used for Perfect Forward Secrecy (PFS) key distribution.

2. The non-transitory computer readable medium of claim 1, wherein the instructions are further effective to cause at least one processor of the first network device to:
    prior to the derivation of the private key encryption key, establish a second network device as the live peer device by confirming common possession of the Connectivity Association Key (CAK) between the first network device and the second network device.

3. The non-transitory computer readable medium of claim 2, wherein the second network device is one of a plurality of network devices, and wherein the Connectivity Association Key (CAK) is shared between the first network device and each of the plurality of network devices to be established as a respective live peer device.

4. The non-transitory computer readable medium of claim 1, wherein the communication from the live peer device comprises at least one session between the first network device and the live peer device, each of the at least one session is encrypted by a corresponding MACsec Secret Key (SAK).

5. The non-transitory computer readable medium of claim 4, wherein the private key encryption key is unique for each of the at least one session between the first network device and the live peer device.

6. The non-transitory computer readable medium of claim 4, wherein the secret key is unique for each of the at least one session between the first network device and the live peer device.

7. The non-transitory computer readable medium of claim 1, the secret key is encrypted under an Advanced Encryption Standard (AES).

8. The non-transitory computer readable medium of claim 1, wherein the secret key is used to encrypt a MAC Security Standard (MACsec) session.

9. The non-transitory computer readable medium of claim 1, wherein a Diffie-Hellman (DH) key comprises the public key, the first private key of the first network device, and the second private key of the live peer device, and the Key Encrypting Key (KEK) is derived from the Connectivity Association Key (CAK) and the Diffie-Hellman (DH) key.

10. The non-transitory computer readable medium of claim 9, wherein derive the private encryption key further comprises an announcement Type-Length-Value (TLV) for an announcement parameter set, to carry parameter set of the Diffie-Hellman (DH) key.

11. A method comprising:
    deriving, by a first network device, a private key encryption key based on a Diffie-Hellman Key, and a Connectivity Association Key (CAK);
    transmitting, by the first network device, a secret key encrypted by the private key encryption key to the live peer device; and
    receiving, by the first network device, a communication from the live peer, the communication being encrypted by the secret key;
    wherein the private key encryption key is used for Perfect Forward Secrecy (PFS) key distribution, wherein the secret key is used to encrypt a MAC Security Standard (MACsec) session.

12. The method of claim 11, wherein the communication from the live peer device comprises at least one session between the first network device and the live peer device, each of the at least one session is encrypted by a corresponding MACsec Secret Key (SAK).

13. The method of claim 12, wherein the private key encryption key is unique for each of the at least one session between the first network device and the live peer device.

14. The method of claim 12, wherein the secret key is unique for each of the at least one session between the first network device and the live peer device.

15. The method of claim 11, wherein the Diffie-Hellman (DH) key comprises a public key, a first private key of the first network device, a the second private key of the live peer device, and the Key Encrypting Key (KEK) is derived from the Connectivity Association Key (CAK) and the Diffie-Hellman (DH) key.

* * * * *